United States Patent [19]
Brownmiller et al.

[11] Patent Number: 5,768,261
[45] Date of Patent: Jun. 16, 1998

[54] SYSTEM AND METHOD FOR IDENTIFYING THE TECHNIQUE USED FOR FAR-END PERFORMANCE MONITORING OF A DS1 AT A CUSTOMER SERVICE UNIT

[75] Inventors: Curtis Brownmiller, Richardson; Mike Bencheck, Garland; Minh Tran, Plano; Robert Branton, Farmers Branch; Mark DeMoss, The Colony; Steve Landon, Richardson, all of Tex.

[73] Assignee: MCI Communications Corporation, Washington, D.C.

[21] Appl. No.: 671,028

[22] Filed: Jun. 25, 1996

[51] Int. Cl.$^6$ ........................................ H04J 3/14
[52] U.S. Cl. .................. 370/252; 370/242; 370/466; 379/29
[58] Field of Search .................. 370/241, 249, 370/252, 470, 526, 466, 242; 379/5, 34, 113, 13, 22, 29

[56] References Cited

U.S. PATENT DOCUMENTS

| | | | |
|---|---|---|---|
| 4,937,825 | 6/1990 | Ballard et al. | 371/20.1 |
| 5,157,667 | 10/1992 | Carusone, Jr. et al. | 395/183.21 |
| 5,189,674 | 2/1993 | Shimizu | 371/20.1 |
| 5,233,600 | 8/1993 | Pekarske | 370/228 |
| 5,299,201 | 3/1994 | Carusone, Jr. et al. | 371/5.1 |
| 5,347,566 | 9/1994 | Law et al. | 379/27 |
| 5,412,652 | 5/1995 | Lu | 370/223 |
| 5,436,909 | 7/1995 | Dev et al. | 395/182.02 |
| 5,446,680 | 8/1995 | Sekiya et al. | 364/550 |
| 5,452,306 | 9/1995 | Turudic et al. | 370/465 |
| 5,455,832 | 10/1995 | Bowmaster | 371/20.1 |
| 5,463,634 | 10/1995 | Smith et al. | 371/20.6 |
| 5,473,665 | 12/1995 | Hall et al. | 379/29 |
| 5,483,520 | 1/1996 | Eychenne et al. | 370/222 |
| 5,566,161 | 10/1996 | Hartman et al. | 370/249 |
| 5,566,162 | 10/1996 | Gruber et al. | 370/242 |
| 5,661,778 | 8/1997 | Hall et al. | 379/142 |

OTHER PUBLICATIONS

Banerjee et al., "ISDN Primary Rate Access Maintenance," *IEEE*, 1989, pp. 2.6.1–2.6.5.
Cadieux et al., "A New Network Element for Performance Monitoring and Test Access Spanning the Digital Hierarchy," *IEEE*, 1990, pp. 324.4.1–334.4.5.
Kerschberg et al., "Intelligent Network Management: A Heterogeneous Knowledge Source Approach," *IEEE*, 1990, pp. 314–316.
Mageed et al., "Fault Detection and Indentification Using a Hierarchical Neural Network–Based System," *IEEE*, 1993, pp. 338–343.

*Primary Examiner*—Benedict V. Safourek
*Assistant Examiner*—Kenneth Vanderpuye

[57] ABSTRACT

Described herein are a system and method of determining a far-end format of a customer service unit (CSU) operating using an Extended SuperFrame (ESF) framing format. The CSU is in communication with a network element over a DS 1 circuit. The system operates by determining whether any performance data was received from the CSU during a preceding time interval. If no performance data was received from the CSU during the preceding time interval, then the system determines whether the network element is currently configured to operate according to ANSI standard T1.403 or AT&T Recommendation 54016. If the network element is currently configured to operate according to AT&T Recommendation 54016, then the system commands the network element to operate according to ANSI standard T1.403. The system then waits a predetermined time period for receipt of valid performance data conforming to ANSI standard T1.403 from the CSU. If valid performance data conforming to ANSI standard T1.403 is received from the CSU during the predetermined time period, then the system commands the network element to operate according to ANSI standard T1.403 until further notice. If valid performance data conforming to ANSI standard T1.403 is not received from the CSU during the predetermined time period, then the system commands the network element to return to operating according to AT&T Recommendation 54016.

17 Claims, 5 Drawing Sheets

SYSTEM AND METHOD FOR IDENTIFYING THE TECHNIQUE USED FOR FAR-END PERFORMANCE MONITORING OF A DS1 AT A CUSTOMER SERVICE UNIT

BACKGROUND OF THE INVENTION

1. Field of the Invention

The present invention generally relates to network management in a telecommunications system, and more particularly relates to performance monitoring at customer service units.

2. Related Art

A telecommunications environment typically includes a long distance carrier network connected to a customer premises via a local exchange carrier (LEC). The long distance carrier provides services to the customer through, for example, a well known DS1 circuit. DS stands for digital signal. DS1 is a circuit format having a rate of 1.544 Mbps.

A customer service unit (CSU) located on the customer premises represents the customer's interface to the long distance carrier network (via the LEC). Typically, the CSU monitors the performance of the DS1 circuit. Such performance monitoring includes the detection and accumulation of statistics on code violations, errors, unavailabilities, out of frames, etc. Such statistics are called performance data, or performance monitoring (PM) data.

It is important that the CSU at the customer premises transmit the performance data to the long distance carrier. Network management entities in the long distance carrier need the performance data in order to effectively manage the performance of the customer's DS1 circuit. From the perspective of the long distance carrier, the process of obtaining the performance data is called DS1 far-end performance monitoring. Conventionally, the CSU must be operating in the Extended SuperFrame (ESF) framing format in order to convey performance data to the long distance carrier. The ESF framing format provides a data channel through which performance data may be transmitted. The ESF framing format is well known.

The data channel provided by the ESF framing format enables the CSU to transmit performance data using one of two well known methods. These performance data transmission methods are generally called far-end formats. The first far-end format is defined by AT&T Recommendation 54016 (also called the AT&T protocol or the 54016 protocol). The AT&T protocol is described in a number of publicly available documents, such as AT&T Data Communications Technical Reference, Pub. 54016, Requirements for Interfacing Digital Terminal Equipment to Services Employing the Extended Superframe Format, 1986–1990, which is herein incorporated by reference in its entirety. The second far-end format is defined by ANSI standard T1.403 (also called the ANSI protocol or the T1.403 protocol). The ANSI protocol is described in a number of publicly available documents, such as ANSI T1.403-1995-Telecommunications-Network-to-Customer Installation-DS1 Metallic Interface, 1995, which is herein incorporated by reference in its entirety.

According to the AT&T protocol, the CSU detects, accumulates, and stores performance data. The CSU does not automatically send the performance data to the network management entities in the long distance carrier. Instead, such network management entities must periodically inject a message into the T1 circuit to command the CSU to transmit the performance data. In response to the message, the CSU sends the performance data to the long distance carrier. Note that the injection of the message into the T1 circuit requires an intrusive connection to the DS1 circuit.

According to the ANSI protocol, the CSU detects, accumulates, and stores performance data. In contrast to the AT&T standard, the CSU also automatically sends the performance data (in Performance Reporting Messages, PRMs) to the long distance carrier every second. Thus, in order to receive performance data, the network management entities in the long distance carrier need only non-intrusively monitor transmissions from the CSU.

Typically, the customer selects the far-end format (that is, the customer controls the method that is used to transmit performance data). At the time of installation (i.e., when the long distance carrier provisions service for the customer), the far-end format is not known to the long distance carrier. Also, the customer can change the far-end format at any time after installation. Often, the long distance carrier is not informed of these changes, or is informed after significant delay (the customer may change the far-end format during equipment upgrades, for example).

In order to effectively and efficiently monitor the performance of the customer's T1 circuit, network management entities in the long distance carrier must have current knowledge of the customer's far-end format. Thus, a system and method are required for enabling network management entities in the long distance carrier to determine a customer's far-end format on a timely basis.

One approach is to designate one of the protocols as the default (such as the ANSI protocol), and then adjust when current information is provided by the CSU. This approach is not ideal, however, since it may be some time before the CSU informs the long distance carrier of its current far-end format.

SUMMARY OF THE INVENTION

The present invention is directed to a system and method of determining a far-end format of a customer service unit (CSU) operating using an Extended SuperFrame (ESF) framing format. The CSU is in communication with a network element over a DS1 circuit.

The system operates by determining whether any performance data was received from the CSU during a preceding time interval. If no performance data was received from the CSU during the preceding time interval, then the system determines whether the network element is currently configured to operate according to ANSI standard T1.403 or AT&T Recommendation 54016. If the network element is currently configured to operate according to AT&T Recommendation 54016, then the system commands the network element to operate according to ANSI standard T1.403. The system then waits a predetermined time period for receipt of valid performance data conforming to ANSI standard T1.403 from the CSU. If valid performance data conforming to ANSI standard T1.403 is received from the CSU during the predetermined time period, then the system commands the network element to operate according to ANSI standard T1.403 until further notice. If valid performance data conforming to ANSI standard T1.403 is not received from the CSU during the predetermined time period, then the system commands the network element to return to operating according to AT&T Recommendation 54016.

If the network element is currently configured to operate according to ANSI standard T1.403, then the system commands the network element to operate according to AT&T Recommendation 54016. The system waits a predetermined time period for receipt of valid performance data conforming to AT&T Recommendation 54016 from the CSU. If valid performance data conforming to AT&T Recommendation 54016 is received from the CSU during the predetermined time period, then the system commands the network element to operate according to AT&T Recommendation 54016 until further notice. If valid performance data conforming to AT&T Recommendation 54016 is not received from the CSU during the predetermined time period, then the system commands the network element to return to operating according to ANSI standard T1.403.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for enabling network management entities in a long distance carrier to automatically, periodically, and on a timely basis determine a customer's far-end format. The invention also includes automatically adjusting to changes in the customer's far-end format.

The ability to automatically determine the customer's far-end format streamlines subsequent retrieval of performance data from the customer. Also, by operating periodically, the invention is able to identify the customer's current far-end format, even after the customer changes its far-end format.

Figure 1:
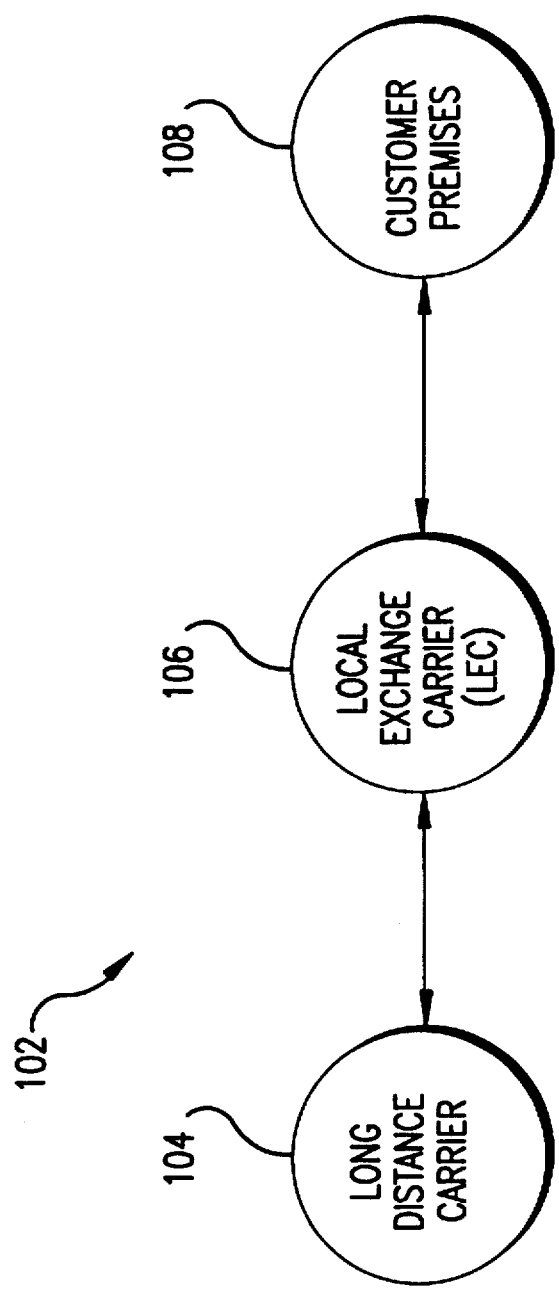
FIG. 1 is a high-level block diagram of a telecommunications environment of the present invention.

FIG. 1 is a block diagram of a telecommunications environment 102 according to a preferred embodiment of the present invention. The telecommunications environment 102 includes a long distance carrier 104 connected to a customer premises 108 via a local exchange carrier (LEC) 106.

The other end of the circuit contains a mirrored configuration, although this other end has not been shown for simplicity purposes.

Figure 2:
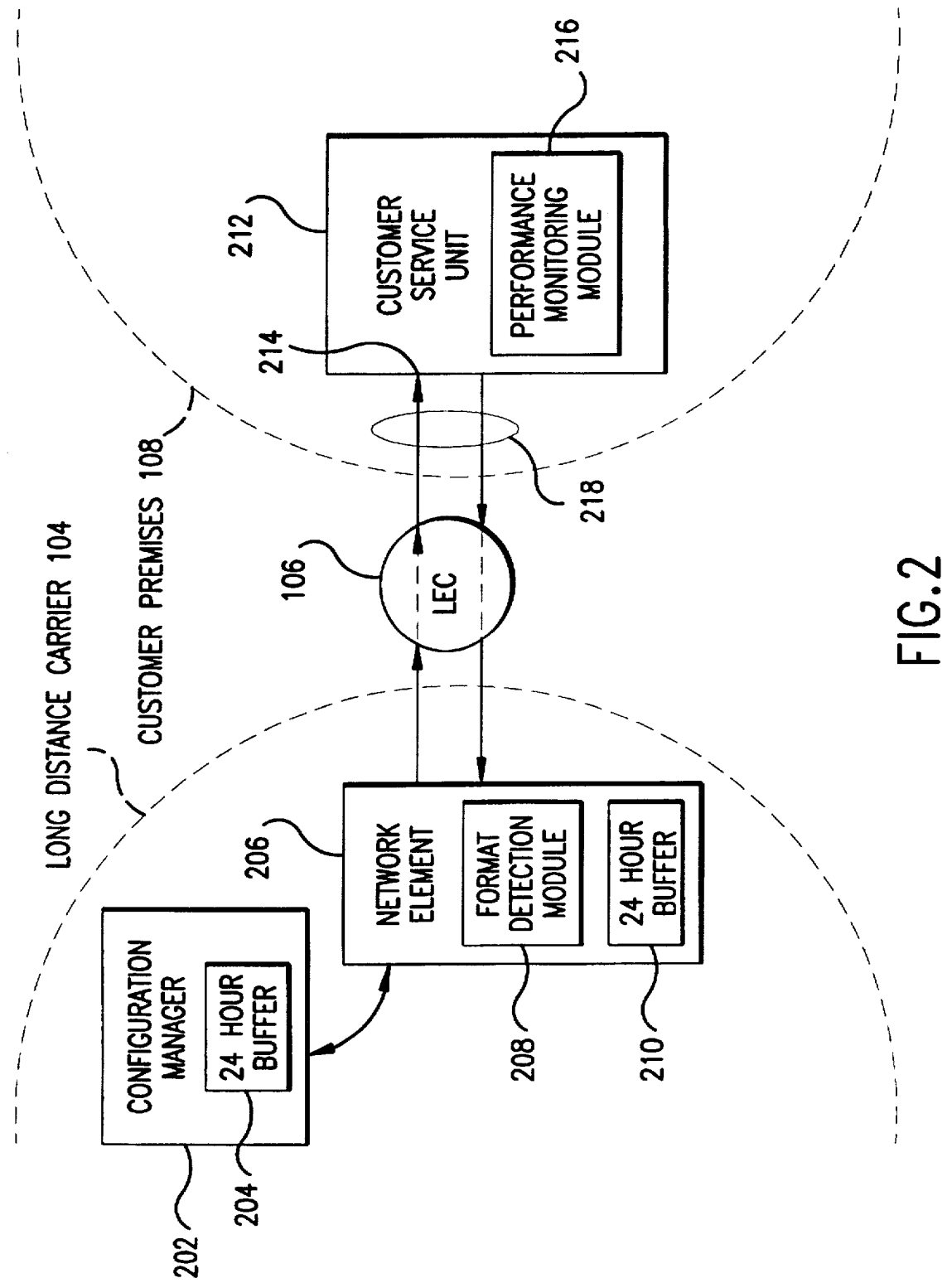
FIG. 2 is a more detailed block diagram of the telecommunication environment according to a preferred embodiment of the present invention.

FIG. 2 is a more detailed block diagram of the telecommunications environment 102. (The other end of the circuit contains a mirrored configuration, although this other end has not been shown for simplicity purposes.) As shown in FIG. 2, the long distance carrier 104 includes a plurality of network elements, such as network element 206. The network element 206 may be a wideband DCS (digital cross-connect system) or any other telecommunication device that performs DS1 far-end performance monitoring. The customer premises 108 includes one or more customer service units, such as customer service unit (CSU) 212. The CSU 212 is a well known device and operates to protect the LEC 106 from mishaps to the customer premises 108 and, similarly, operates to protect the customer premises 108 from mishaps to the LEC 106.

The long distance carrier 104 provides telecommunications services to the customer premises 108 via one or more circuits, such as circuit 218. Preferably, the circuit 218 is a DS1 circuit.

The CSU 212 includes a performance monitoring module 216. The performance monitoring module 216 monitors the performance of the DS1 circuit 218 at a receive point 214 (i.e., at the point at which the CSU 212 receives transmissions from the network element 206 via the LEC 106). Preferably, the CSU 212 operates in the well known Extended SuperFrame (ESF) framing format so as to convey performance data to the network element 206. Preferably, the CSU 212 transmits performance data using the well known AT&T protocol and/or the ANSI protocol, cited above.

Figure 3:
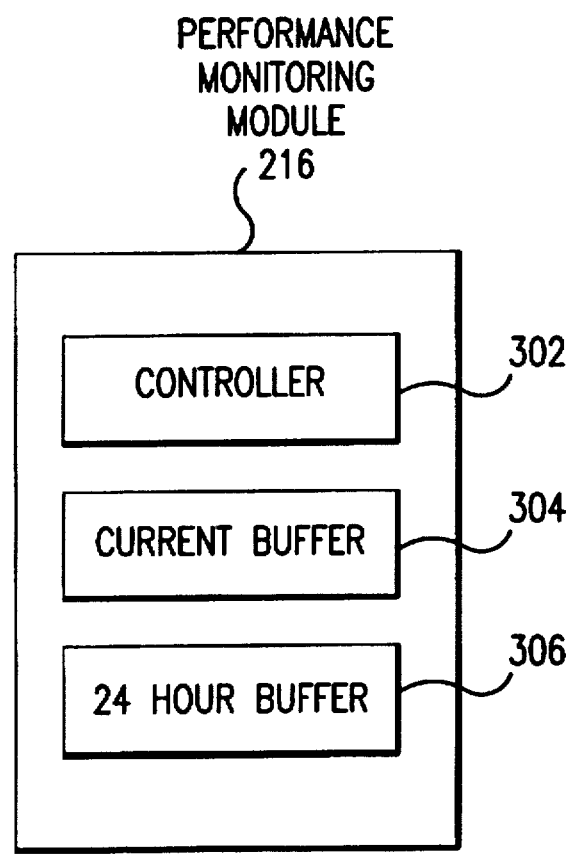
FIG. 3 is a block diagram of a performance monitoring module.

FIG. 3 is a block diagram of the performance monitoring module 216. The performance monitoring module 216 includes a current buffer 304. If it supports the AT&T protocol, then the performance monitoring module 216 also includes a 24 hour buffer 306. The current buffer 304 is used to store the performance data accumulated for the current 15 minute period. The 24 hour buffer 306 is used to store the performance data accumulated for the current 24 hour interval. A controller 302 controls the operation of the performance monitoring module 216.

The operation of the performance monitoring module 216 when transmitting performance data using the AT&T protocol shall now be described. The performance monitoring module 216 monitors and obtains performance data pertaining to the DS1 circuit 218 at receive point 214 every second. The performance data is stored in the current buffer 304. Every 15 minutes, the performance data accumulated in the current buffer 304 is transferred to the 24 hour buffer 306. The current buffer 304 is then cleared, and begins accumulating performance data for the next 15 minute period.

The 24 hour buffer 306 includes a memory location for each 15 minute period in a 24 hour interval. Thus, the 24 hour buffer 306 includes 96 memory locations. Every 15 minutes, the contents of the current buffer 304 are stored in an unoccupied memory location of the 24 hour buffer 306.

When the far-end mode is the AT&T protocol, the performance monitoring module 216 does not automatically send performance data to the network element 206. Instead, the performance monitoring module 216 sends performance data to the network element 206 only when so requested by the network element 206.

This interaction between the network element 206 and the performance monitoring module 216 represents a command/response transaction. In particular, the network element 206 sends a command to the CSU 212 over the DS1 circuit 218. The command specifies the 15 minute periods for which performance data is required. In response to the command, the performance monitoring module 216 retrieves the requested performance data from the current buffer 304 and/or the 24 hour buffer 306 and sends the retrieved performance data to the network element 206 over the DS1 circuit 218.

The operation of the performance monitoring module 216 when transmitting performance data using the ANSI protocol shall now be described. The performance monitoring module 216 monitors and obtains performance data pertaining to the DS1 circuit 218 at receive point 214 every second. Every second, the performance monitoring module 216 automatically sends the previous one-second amount of performance data to the network element 206 over the DS1 circuit 218. The network element 206 does not need to send any messages to the CSU 212 in order to obtain performance data. Instead, the network element 206 need only monitor transmissions from the CSU 212 to obtain performance data.

Referring again to FIG. 2, the network element 206 includes a 24 hour buffer 210, which is similar to the 24 hour buffer 306 in the performance monitoring module 216. The network element 206 stores performance data in the 24 hour buffer 210 as it receives it from the CSU 212. Preferably, the network element 206 stores data in 15 minute periods. That is, the network element 206 accumulates performance data for 15 minutes (the network element 206 may include a current buffer, similar to the current buffer 304 in the performance monitoring module 216, for temporarily buffering this performance data), and then stores the accumulated performance data in the 24 hour buffer 210. The 24 hour buffer 210 stores performance data received from the CSU 212 during the current 24 hour interval. The 24 hour buffer 210 includes a memory location for each of the 15 minute periods over a 24 hour interval. Thus, the 24 hour buffer 210 includes 96 memory locations.

The network element 206 also includes a format detection module 208. The format detection module 208 automatically, periodically, and on a timely basis determines the current far-end format at the CSU 212. The format detection module 208 also causes the network element 206 to adjust to changes in the CSU 212's far-end format.

Figure 4:
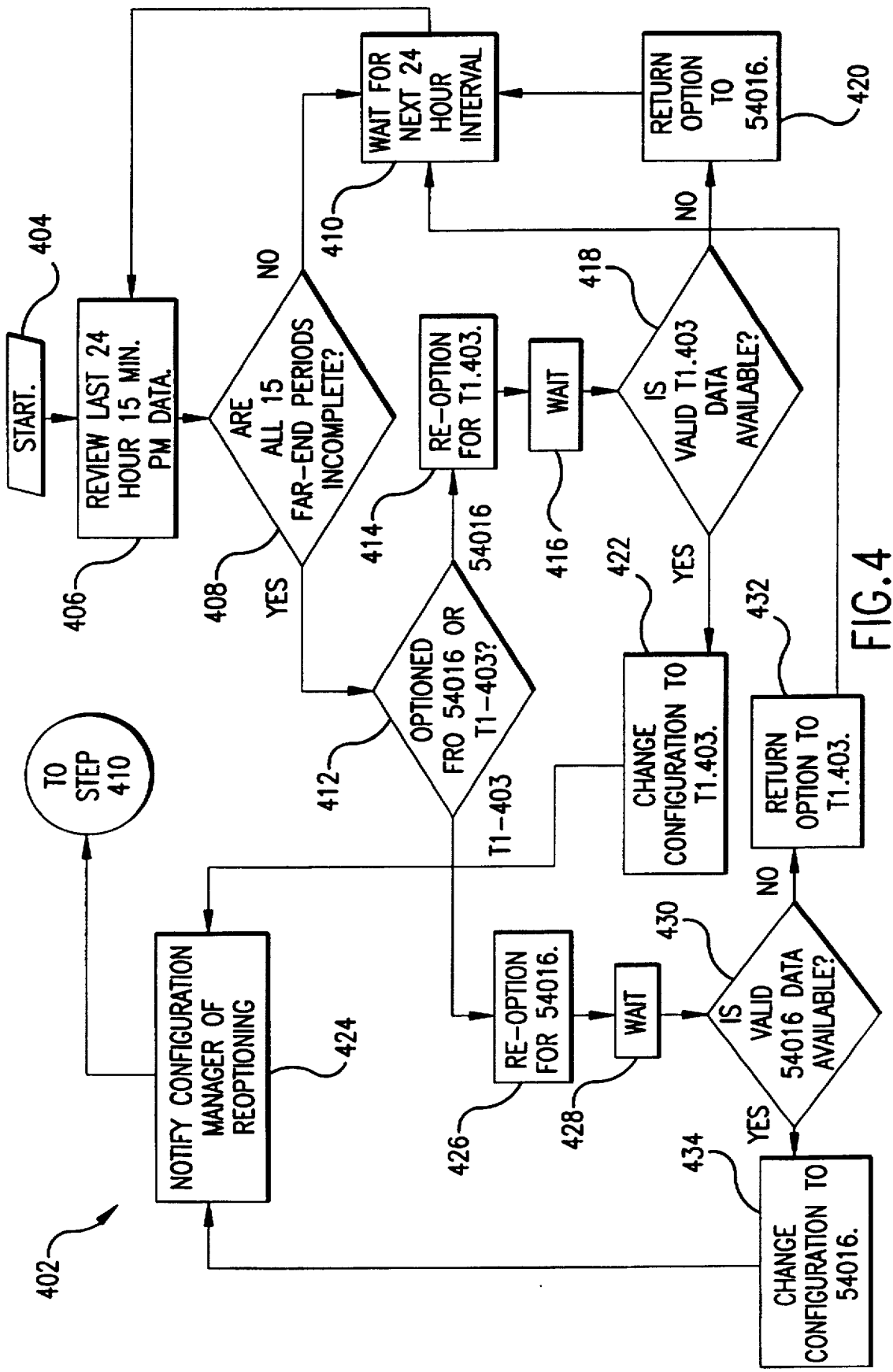
FIG. 4 is a flowchart representing the preferred operation of the invention.

The operation of the format detection module 208 shall now be described with reference to a flowchart 402 in FIG. 4. Preferably, the steps of flowchart 402 are performed once every interval, where the interval is preferably equal to 24 hours. However, the interval may be set to other time spans, such as 12 hours, 48 hours, etc.

In step 406, the format detection module 208 reviews the performance monitoring (PM) data in the 24 hour buffer 210 for the most recent 24 hour interval. Based on this review, the format detection module 208 in step 408 determines whether all of the 15 minute periods are incomplete. In other words, the format detection module 208 in step 408 determines whether all of the 96 memory locations in the 24 hour buffer 210 are empty, indicating that performance data was not received from the CSU 212 for any of the 15 minute periods over the last 24 hours.

If all of the 15 minute periods are not incomplete, then performance data was received from the CSU 212 during at least one of the 15 minute periods over the last 24 hours. Accordingly, the format detection module 208 concludes that any non-receipt of performance data from the CSU 212 during the last 24 hours was likely due to factors other than a change in the CSU 212's far-end format. Such factors include problems with the DS1 circuit 218, service interruptions with the CSU 212, etc. Generally, the likelihood of occurrence of these factors is greater than the likelihood of a change in the CSU's 212 far-end format. Accordingly, the format detection module 208's conclusion that any non-receipt of performance data from the CSU 212 during the last 24 hours was due to factors other than a change in the CSU 212's far-end format is usually accurate.

Therefore, if all of the 15 minute periods are not incomplete, then the format detection module 208 in step 410 discontinues its operation for the 24 hour interval currently being reviewed, and waits for the end of the next 24 hour interval. At that time, the format detection module 208 will perform the steps of flowchart 402 starting from step 406 for that next interval.

If, in step 408, the format detection module 208 determines that all of the 15 minute periods are incomplete, then the format detection module 208 concludes that there is a fair chance that the non-receipt of data during the last 24 hours was due to a change in the CSU 212's far-end format. Accordingly, the format detection module 208 performs step 412, where it begins a process for determining whether the CSU 212's far-end format has changed.

Particularly, in step 412 the format detection module 208 determines whether the network element 206 is currently configured (i.e., optioned) to operate according to AT&T Recommendation 54016 or ANSI standard T1.403. If the network element 206 is currently configured to operate according to AT&T Recommendation 54016, then step 414 is performed (described below). If, instead, the network element 206 is currently configured to operate according to ANSI standard T1.403, then step 426 is performed.

In step 426, the format detection module 208 commands the network element 206 to re-option itself for operation according to the AT&T Recommendation 54016. As a result of such re-optioning, the network element 206 intrusively connects to the DS1 circuit 218 and transmits a message to the CSU 212, requesting that the CSU 212 retrieve and return performance data to the network element 206.

In step 428, after transmitting this message to the CSU 212, the format detection module 208 waits for a predetermined time period. The length of this predetermined time period is set equal to an amount of time necessary to allow the CSU 212 to receive and respond to the message. Preferably, the predetermined time period is set equal to 30 minutes.

In step 430, after the predetermined time period elapses, the format detection module 208 determines whether valid data in conformance with AT&T Recommendation 54016 was received in response to the message sent in step 426. If valid data in conformance with AT&T Recommendation 54016 was received, then the format detection module 208 concludes that the CSU 212 has changed its far-end format to the AT&T Recommendation 54016. Accordingly, in step 434 the format detection module 208 commands the network element 206 to continue operating according to AT&T Recommendation 54016 until further notice. Also, the format detection module 208 in step 424 informs the configuration manager 202 of the change in the far-end format of the CSU 212, and the re-configuration of the network element 206. Control then flows to step 410, where the format detection module 208 suspends itself until the end of the next 24 hour interval.

If, in step 430, the format detection module 208 determined that valid data in conformance with AT&T Recommendation 54016 was not received in response to the message sent in step 426, then step 432 is performed. In step 432, the format detection module 208 commands the network element 206 to return to operating according to ANSI standard T1.403. Control then flows to step 410, where the format detection module 208 suspends itself until the end of the next 24 hour interval.

Returning to step 412, if the network element 206 is currently configured to operate according to AT&T Recommendation 54016, then step 414 is performed.

In step 414, the format detection module 208 commands the network element 206 to re-option itself for operation according to the ANSI standard T1.403. As a result of such re-optioning, the network element 206 discontinues the intrusive connections to the DS1 circuit 218 for the purpose of transmitting performance data request messages to the CSU 212. Instead, the network element 206 begins to monitor for transmissions from the CSU 212 containing valid data in conformance with ANSI standard T1.403.

In step 416, the format detection module 208 waits for the predetermined time period (described above).

In step 418, after the predetermined time period elapses, the format detection module 208 determines whether valid data in conformance with ANSI standard T1.403 was received during the predetermined time period of step 416. If valid data in conformance with ANSI standard T1.403 was received, then the format detection module 208 concludes that the CSU 212 has changed its far-end format to the ANSI standard T1.403. Accordingly, in step 422 the format detection module 208 commands the network element 206 to continue operating according to ANSI standard T1.403 until further notice. Also, the format detection module 208 in step 424 informs the configuration manager 202 of the change in the far-end format of the CSU 212, and the re-configuration of the network element 206. Control then flows to step 410, where the format detection module 208 suspends itself until the end of the next 24 hour interval.

If, in step 418, the format detection module 208 determined that valid data in conformance with ANSI standard T1.403 was not received, then step 420 is performed. In step 420, the format detection module 208 commands the network element 206 to return to operating according to AT&T Recommendation 54016. Control then flows to step 410, where the format detection module 208 suspends itself until the end of the next 24 hour interval.

Thus far, the far-end format recognition process has been described as being controlled by the format detection module 208 in the network element 206. In alternate embodiments, such control resides in other network management entities of the long distance carrier 104. For example, in one embodiment of the invention, control of the far-end format recognition process resides with the configuration manager 202.

Preferably, the configuration manager 202 includes a 24 hour buffer 204, which is similar to the 24 hour buffer 306 in the performance monitoring module 216. The network element 206 periodically transmits performance data received from the CSU 212 to the configuration manager 202. The configuration manager 202 stores this performance data in its 24 hour buffer 204. The configuration manager 202 also stores information that indicates the current configuration of the network element 206 (i.e., whether the network element 206 is currently configured for operation according to ANSI standard T1.403 or AT&T Recommendation 54016).

Thus, the configuration manager 202 has the means to perform the steps of flowchart 402, or to command the network element 206 to perform the steps of flowchart 402.

Figure 5:
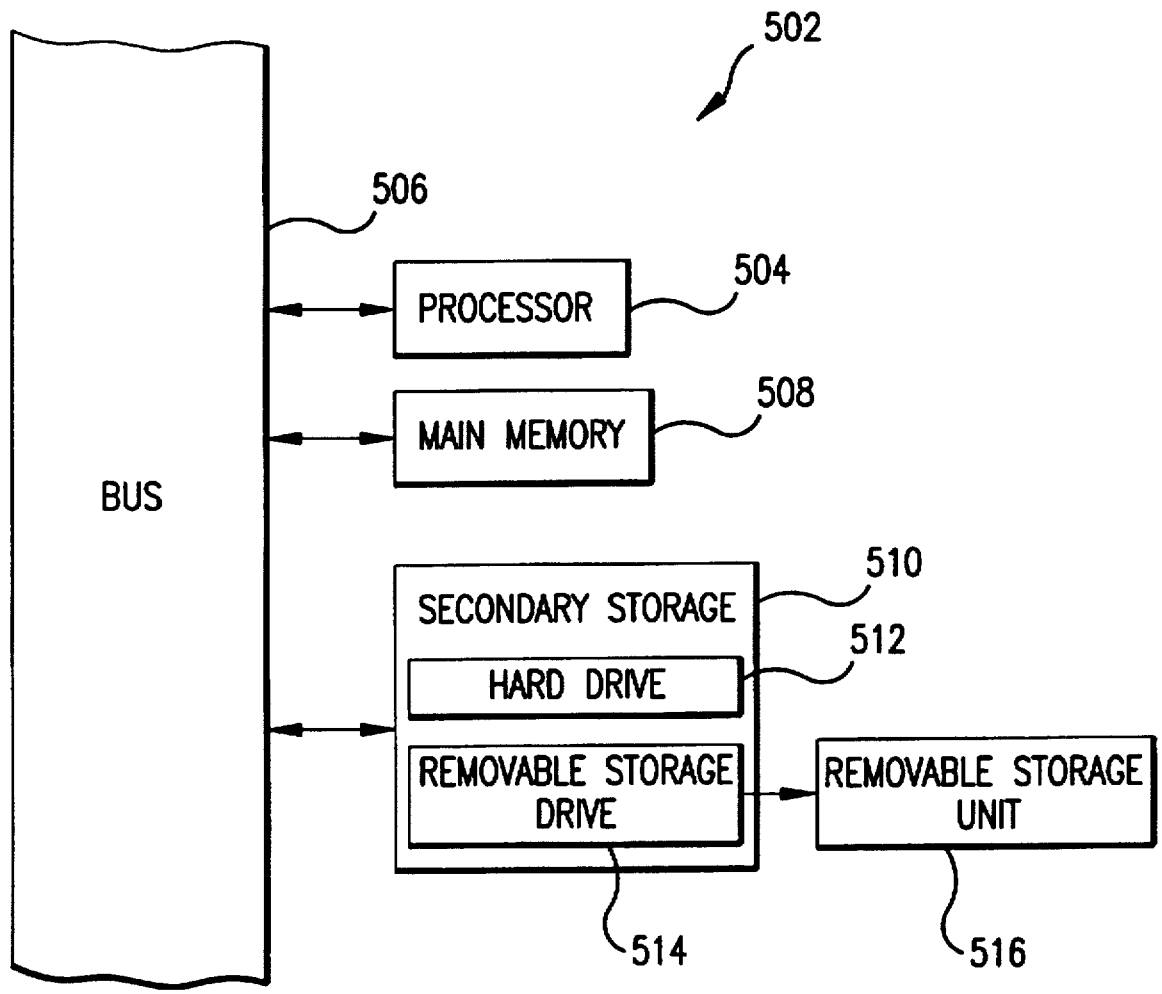
FIG. 5 is a block diagram of a computing structure useful for implementing components of the invention.

In an embodiment of the invention, components of the invention are at least partially implemented using a computing structure 502 shown in FIG. 5. Such components include, for example, the network element 206 and the configuration manager 202. The computing structure 502 includes one or more processors, such as processor 504. The processor 504 is connected to a communication bus 506.

The computing structure 502 also includes a main memory 508, preferably random access memory (RAM), and secondary storage 510. The secondary storage 510 includes, for example, a hard disk drive 512 and/or a removable storage drive 514, representing a floppy disk drive, a magnetic tape drive, a compact disk drive, etc. The removable storage drive 514 reads from and/or writes to a removable storage unit 516 in a well known manner.

Removable storage unit 516, also called a program storage device or a computer program product, represents a floppy disk, magnetic tape, compact disk, etc. As will be appreciated, the removable storage unit 516 includes a computer usable storage medium having stored therein computer software and/or data.

Computer programs (also called computer control logic) are stored in main memory 508 and/or the secondary storage 510. Such computer programs, when executed, enable the computing structure 502 to perform the features of the 10 present invention as discussed herein. In particular, the computer programs, when executed, enable the processor 504 to perform the features of the present invention. Accordingly, such computer programs represent controllers of the computing structure 502.

In another embodiment, the invention is directed to a computer program product comprising a computer readable medium having control logic (computer software) stored therein. The control logic, when executed by the processor 504, causes the processor 504 to perform the functions of the invention as described herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

what is claimed is:

1. A method of determining a far-end format of a customer service unit (CSU) operating using an Extended SuperFrame (ESF) framing format and communicating with a network element over a DS1 circuit, comprising the steps of:

(1) determining whether any valid performance data was received from the CSU during a preceding time interval;

(2) if no performance data was received from the CSU during the preceding time interval, then determining whether the network element is currently configured to operate according to ANSI standard T1.403 or AT&T Recommendation 54016;

(3) if the network element is currently configured to operate according to AT&T Recommendation 54016, then commanding the network element to operate according to ANSI standard T1.403;

(4) waiting a predetermined time period for receipt of valid performance data conforming to ANSI standard T1.403 from the CSU; and (5) if valid performance data conforming to ANSI standard T1.403 is received from the CSU during the predetermined time period, then commanding the network element to operate according to ANSI standard T1.403 until further notice.

2. The method of claim 1, further comprising the step of:

(6) if valid performance data conforming to ANSI standard T1.403 is not received from the CSU during the predetermined time period, then commanding the network element to return to operating according to AT&T Recommendation 54016.

3. The method of claim 1, further comprising the steps of:

(6) if the network element is currently configured to operate according to ANSI standard T1.403, then commanding the network element to operate according to AT&T Recommendation 54016;

(7) waiting a predetermined time period for receipt of valid performance data conforming to AT&T Recommendation 54016 from the CSU; and (8) if valid performance data conforming to AT&T Recommendation 54016 is received from the CSU during the predetermined time period, then commanding the network element to operate according to AT&T Recommendation 54016 until further notice.

4. The method of claim 3, further comprising the step of:

(9) if valid performance data conforming to AT&T Recommendation 54016 is not received from the CSU during the predetermined time period, then commanding the network element to return to operating according to ANSI standard T1.403.

5. A method of determining a far-end format of a customer service unit (CSU) communicating with a network element, comprising the steps of:

(1) determining whether any performance data was received from the CSU during a preceding time interval;

(2) if no performance data was received from the CSU during the preceding time interval, then determining whether the network element is currently configured to operate according to a first far-end format or a second farend format;

(3) if the network element is currently configured to operate according to the second far-end format, then commanding the network element to operate according to the first far-end format;

(4) waiting a predetermined time period for receipt of valid performance data conforming to the first far-end format from the CSU; and (5) if valid performance data conforming to the first far-end format is received from the CSU during the predetermined time period, then commanding the network element to operate according to the first far-end format until further notice.

6. The method of claim 5, further comprising the step of:

(6) if valid performance data conforming to the first far-end format is not received from the CSU during the predetermined time period, then commanding the network element to return to operating according to the second far-end format.

7. The method of claim 5, further comprising the steps of:

(6) if the network element is currently configured to operate according to the first far-end format, then commanding the network element to operate according to the second far-end format;

(7) waiting a predetermined time period for receipt of valid performance data conforming to the second far-end format from the CSU; and (8) if valid performance data conforming to the second far-end format is received from the CSU during the predetermined time period, then commanding the network element to operate according to the second far-end format until further notice.

8. The method of claim 7, further comprising the step of:

(9) if valid performance data conforming to the second far-end format is not received from the CSU during the predetermined time period, then commanding the network element to return to operating according to the first far-end format.

9. The method of claim 5, wherein the first far-end format is ANSI standard T1.403 and the second far-end format is AT&T Recommendation 54016.

10. A system for determining a far-end format of a customer service unit (CSU) operating using an Extended SuperFrame (ESF) framing format and communicating with a network element over a DS1 circuit, comprising:

means for determining whether any performance data was received from the CSU during a preceding time interval;

means for determining whether the network element is currently configured to operate according to ANSI standard T1.403 or AT&T Recommendation 54016 if no performance data was received from the CSU during the preceding time interval;

means for commanding the network element to operate according to ANSI standard T1.403 if the network element is currently configured to operate according to AT&T Recommendation 54016;

means for waiting a predetermined time period for receipt of valid performance data conforming to ANSI standard T1.403 from the CSU; and means for commanding the network element to operate according to ANSI standard T1.403 until further notice if valid performance data conforming to ANSI standard T1.403 is received from the CSU during the predetermined time period.

11. The system of claim 10, further comprising:

means for commanding the network element to return to operating according to AT&T Recommendation 54016 if valid performance data conforming to ANSI standard T1.403 is not received from the CSU during the predetermined time period.

12. The system of claim 10, further comprising:

means for commanding the network element to operate according to AT&T Recommendation 54016 if the network element is currently configured to operate according to ANSI standard T1.403;

means for waiting a predetermined time period for receipt of valid performance data conforming to AT&T Recommendation 54016 from the CSU; and means for commanding the network element to operate according to AT&T Recommendation 54016 until further notice if valid performance data conforming to AT&T Recommendation 54016 is received from the CSU during the predetermined time period.

13. The system of claim 12, further comprising:

means for commanding the network element to return to operating according to ANSI standard T1.403 if valid performance data conforming to AT&T Recommendation 54016 is not received from the CSU during the predetermined time period.

14. A method of determining a far-end format of a customer service unit (CSU) communicating with a network element, comprising the steps of:

(1) determining whether the network element is currently configured to operate according to ANSI standard T1.403 or AT&T Recommendation 54016;

(2) if the network element is currently configured to operate according to AT&T Recommendation 54016, then commanding the network element to operate according to ANSI standard T1.403;

(3) waiting a predetermined time period for receipt of valid performance data conforming to ANSI standard T1.403 from the CSU; and (4) if valid performance data conforming to ANSI standard T1.403 is received from the CSU during the predetermined time period, then commanding the network element to operate according to ANSI standard T1.403 until further notice.

15. The method of claim 14, further comprising the step of:

(5) if valid performance data conforming to ANSI standard T1.403 is not received from the CSU during the predetermined time period, then commanding the network element to return to operating according to AT&T Recommendation 54016.

16. The method of claim 14, further comprising the steps of:

(5) if the network element is currently configured to operate according to ANSI standard T1.403, then commanding the network element to operate according to AT&T Recommendation 54016;

(6) waiting a predetermined time period for receipt of valid performance data conforming to AT&T Recommendation 54016 from the CSU; and (7) if valid performance data conforming to AT&T Recommendation 54016 is received from the CSU during the predetermined time period, then commanding the network element to operate according to AT&T Recommendation 54016 until further notice.

17. The method of claim 16, further comprising the step of:

(8) if valid performance data conforming to AT&T Recommendation 54016 is not received from the CSU during the predetermined time period, then commanding the network element to return to operating according to ANSI standard T1.403.

* * * * *